(12) United States Patent
Zhou et al.

(10) Patent No.: US 10,799,836 B2
(45) Date of Patent: Oct. 13, 2020

(54) PREPARATION METHOD FOR TRIPTYL POLYMER SEPARATION MEMBRANE

(71) Applicant: NANJING TECH UNIVERSITY, Nanjing, Jiangsu Province (CN)

(72) Inventors: Haoli Zhou, Nanjing (CN); Fei Tao, Nanjing (CN); Wanqin Jin, Nanjing (CN)

(73) Assignee: NANJING TECH UNIVERSITY, Nanjing, Jiangsu (CN)

( * ) Notice: Subject to any disclaimer, the term of this patent is extended or adjusted under 35 U.S.C. 154(b) by 425 days.

(21) Appl. No.: 15/579,205

(22) PCT Filed: Apr. 25, 2017

(86) PCT No.: PCT/CN2017/081790
§ 371 (c)(1),
(2) Date: Dec. 2, 2017

(87) PCT Pub. No.: WO2018/006635
PCT Pub. Date: Jan. 11, 2018

(65) Prior Publication Data
US 2018/0236408 A1    Aug. 23, 2018

(30) Foreign Application Priority Data
Jul. 7, 2016 (CN) .......................... 2016 1 0534477

(51) Int. Cl.
| | | |
|---|---|---|
| *B01D 67/00* | (2006.01) | |
| *B01D 71/56* | (2006.01) | |
| *C08G 69/40* | (2006.01) | |
| *C08G 69/42* | (2006.01) | |
| *B01D 53/22* | (2006.01) | |
| *B29C 41/00* | (2006.01) | |
| *B29C 41/46* | (2006.01) | |
| *B29K 77/00* | (2006.01) | |
| *B29L 31/00* | (2006.01) | |

(52) U.S. Cl.
CPC ......... *B01D 67/0006* (2013.01); *B01D 53/22* (2013.01); *B01D 53/228* (2013.01); *B01D 67/00* (2013.01); *B01D 71/56* (2013.01); *B29C 41/003* (2013.01); *B29C 41/46* (2013.01); *C08G 69/40* (2013.01); *C08G 69/42* (2013.01); *B29K 2077/00* (2013.01); *B29L 2031/755* (2013.01)

(58) Field of Classification Search
CPC ................................................ B01D 67/0006
See application file for complete search history.

*Primary Examiner* — Larry W Thrower
(74) *Attorney, Agent, or Firm* — Proi Intellectual Property US; Klaus Michael Schmid

(57) ABSTRACT

The Invention discloses a preparation method for a triptyl polymer separation membrane, wherein, it comprises the following steps: take triptycene compound containing active group, dichloride compound and diamino compound containing ether bond as monomers, and conduct polymerization in aprotic organic solvent in the presence of acid-binding agent; pour the obtained polymer solution into deionized water for precipitation after the reaction, filter out precipitates and wash with methanol and dry to get triptyl polymer; dissolve the triptyl polymer in aprotic organic solvent to produce a membrane-casting solution, apply the solution on support and dry to get a triptyl polymer separation membrane. The Invention solves the problem that the reticular polymer material is insoluble, and breaks the restriction for application of such material in separation membrane due to its insoluble and aging features.

10 Claims, 5 Drawing Sheets

PREPARATION METHOD FOR TRIPTYL POLYMER SEPARATION MEMBRANE

CROSS REFERENCE TO RELATED APPLICATIONS

The present application is the US national stage of International Patent Application PCT/CN2017/081790 filed on Apr. 25, 2017, which, in turn, claims priority to Chinese Patent Application CN 201610534477.7 filed on Jul. 7, 2016.

FIELD OF THE INVENTION

The Invention relates to the preparation method for polymer separation membrane, which belongs to the field of macromolecule polymer membrane.

BACKGROUND OF THE INVENTION

Fugitive emission of volatile organic compounds (VOCs) will not only cause a great waste of resources but also lead to environmental pollution and seriously damage human health. Therefore, China has formulated plural laws to control fugitive emission of VOCs. In order to meet the requirement of laws on the concentration of emissions, many mature industrial processes for VOC treatment have been developed, including absorption method, adsorption method, condensation method, biological method and membrane separation method. Compared with other separation methods, the membrane separation method is featured by low energy consumption, easy operation, no secondary pollution and high safety performance and is titled as the most promising gas separation technology.

Since triptycene has unique 3D rigid structure and large internal free cavity, it is the excellent material for preparing polymer of intrinsic microporosity. By taking advantage of the rich reaction and deviation sites of triptycene, it is possible to prepare reticular polymer materials. Since the reticular polymer of intrinsic microporosity has an impalpable structure, high stability and organic micropores, it is also widely used in fields such as gas sorption, hydrogen storage and gas separation. However, the reticular polymer of intrinsic microporosity is insoluble in common solvents and is prone to age; the application of such material is greatly limited.

SUMMARY OF THE INVENTION

The Invention is to provide a preparation method for a triptyl polymer separation membrane, so as to solve the problem that the reticular polymer material is insoluble, and break the restriction for application of such material in separation membrane due to its insoluble and aging features.

The purpose of the Invention can be achieved by the following measures:

A preparation method for a triptyl polymer separation membrane, wherein, it comprises the following steps:
(1) Take triptycene compound containing active group, dichloride compound and diamino compound containing ether bond as monomers, and conduct polymerization in aprotic organic solvent in the presence of acid-binding agent; pour the obtained polymer solution into deionized water for precipitation after the reaction, filter out precipitates and wash with methanol and dry to get triptyl polymer; the triptycene compound containing active group is the multi-amino-substituted triptycene compound or its derivative;
(2) Dissolve the triptyl polymer in aprotic organic solvent to produce a membrane-casting solution, apply the solution on support and dry to get a triptyl polymer separation membrane.

This method comprises the following steps: take the triptycene containing active group as the first monomer, dichloride compound as the second monomer and the diamino compound containing ether bond as the third monomer, and conduct polymerization in the presence of acid-binding agent. Separate out the polymer after the reaction, and further wash with methanol and dry, and then dissolve and prepare separation membrane in aprotic solvent. The polyamide polymer of reticular structure prepared with the method can dissolve in aprotic solvent. Meanwhile, the separation membrane obtained will have higher homogeneity and better separation performance.

In Step (1), the detailed steps for washing of the polymer are as follows: pour polymer solution into deionized water for precipitation, filter out precipitates and wash with methanol for several times and then dry the filtered-out substance to get triptyl polymer; preferably an oven is adopted for drying the filtered-out substance and the drying temperature is 40° C.-120° C.

The triptycene compound containing active group in the Invention is any one selected from hexamino-substituted triptycene compound or its derivative, tetramino-substituted triptycene compound or its derivative, triamino-substituted triptycene compound or its derivative and diamino-substituted triptycene compound or its derivative.

Preferably, the triptycene compound containing active group is any one selected from 2,3,6,7,12,13-hexamino triptycene, 2,3,6,7-tetramino triptycene, 2,6,14-triamino triptycene, 2,7,14-triamino triptycene, 9,10-dimethyl-2,6,14-triamino triptycene, 9,10-dimethyl-2,7,14-triamino triptycene, 2,6-diamino triptycene and 2,7-diamino triptycene, etc.

More preferably, the triptycene compound containing active group is any one selected from 2,6,14-triamino triptycene, 2,7,14-triamino triptycene, 9,10-dimethyl-2,6,14-triamino triptycene, 9,10-dimethyl-2,7,14-triamino triptycene, 2,6-diamino triptycene and 2,7-diamino triptycene.

The dichloride compound in the Invention is any one selected from oxalyl chloride, malonyl chloride, succinyl chloride, glutaryl chloride, adipoyl chloride, 1,7-pimeloyl chloride, azelaoyl chloride, hexafluoro glutaryl chloride, sebacoyl chloride, 1,8-suberoyl chloride, terephthaloyl chloride, isophthaloyl chloride, o-phthaloyl chloride, cyclohexyl-1,4-dicarboxyl chloride, trimesoyl chloride, fumaryl chloride, tetrafluoro terephthaloyl chloride, hexafluoro glutaryl chloride, dodecanedioyl dichloride, 1,8-suberoyl chloride, 2,6-chloroformyl pyridine, 1,4-phenylene diacryloyl chloride, trans-3,6-endo-methylene-1,2,3,6-tetrahydrophthaloyl chloride, 5-amino-2,4,6-triiodo-1,3-benzenedicarboxylic acid acyl chloride, azobenzene-4,4'-dicarbonyl dichloride, 4,4'-biphenyldicarbonyl chloride, trans-cyclobutane-1,2-dicarbonyl dichloride, 1,4-phenylene diacryloyl chloride and bisphenol A bis(chloroformate).

Preferably, the dichloride compound in the Invention is any one selected from oxalyl chloride, malonyl chloride, succinyl chloride, glutaryl chloride, adipoyl chloride, 1,7-pimeloyl chloride, sebacoyl chloride, terephthaloyl chloride, isophthaloyl chloride, o-phthaloyl chloride, cyclohexyl-1,4-dicarboxyl chloride, trimesoyl chloride, fumaryl chloride, tetrafluoro terephthaloyl chloride and hexafluoro glutaryl chloride.

The diamino compound containing ether bond in the Invention can be diamino compound containing ether bond with or without fluorine group, such as any one selected from bis(3-aminopropyl) ether, 3,4-oxydianiline, resorcinol diglycidyl ether, 4,4'-oxydianiline, neopentyl glycol bis(4-aminophenyl) ether, 1,3-bis(4-aminophenoxy)benzene, N-methyl-N-(4-aminophenoxy ethyl)-4-aminophenyl ethanamine, 2,2-bis[4-(4-aminophenoxy)phenyl]-1,1,1,3,3,3-hexafluoropropane, 2,2'-diamino glycol diphenyl ether, 1,8-diamino-3,6-dioxaoctane, bis[4-(3-aminophenoxy)phenyl] sulfone, 1,4-butanediol bis(3-aminocrotonate), 4,4''-diamino-p-terphenyl, 2,2-bis[(4-aminophenoxy)phenyl] hexafluoropropane, 2,2-bis(trifluoromethyl)-4,4-diaminodiphenyl ether, 1,3-bis(2-trifluoromethyl-4-aminophenoxy) benzene, 1,4-bis(2-trifluoromethyl-4-aminophenoxy) benzene and 2,2-bis[4-(4-aminophenoxy)phenyl]propane.

Preferably, the diamino compound containing ether bond in the Invention is any one selected from 3,4-oxydianiline, 4,4'-oxydianiline, 2,2-bis[(4-aminophenoxy)phenyl] hexafluoropropane, 2,2-bis(trifluoromethyl)-4,4-diaminodiphenyl ether, 1,3-bis(2-trifluoromethyl-4-aminophenoxy) benzene, 1,4-bis(2-trifluoromethyl-4-aminophenoxy) benzene and 2,2-bis[4-(4-aminophenoxy)phenyl]propane.

The molar ratio among the three monomers, i.e. the triptycene compound containing active group, dichloride compound and diamino compound containing ether bond is 1:1.0-20.0:0.2-10; preferably 1:2.0-10.0:0.5-5; the molar dosage of acid-binding agent is 1-10 times of that of dichloride compound, preferably 1.5-5 times.

The acid-binding agent in the Invention is organic base or inorganic base, preferably any one selected from pyridine, triethylamine, N,N-diisopropyl ethylamine, 4-dimethylamino pyridine, triethanol amine, potassium carbonate, sodium carbonate, sodium bicarbonate, potassium hydroxide and sodium hydroxide.

In Step (1), the aprotic organic solvent is any one selected from methyl pyrrolidone, dimethyl formamide, dimethyl acetamide, dimethyl sulfoxide and hexamethylphosphoric amide.

In Step (1), the polymerization temperature is −5-15° C. and the reaction time is 1-18 hours and the polymerization is conducted under protection of inert gas.

In Step (2), a detailed method for membrane preparation is as follows: dissolve the triptyl polymer in aprotic organic solvent, produce membrane-casting solution after putting it through vacuum defoaming and leaving it undisturbed, apply the solution on support and dry with an oven to get the triptyl polymer separation membrane; and the drying temperature is 40° C.-150° C. and the drying duration is 2-96 hours.

In Step (2), the aprotic organic solvent is any one selected from methyl pyrrolidone, dimethyl formamide, dimethyl acetamide, dimethyl sulfoxide, acetonitrile, dioxane and hexamethylphosphoric amide.

In Step (2), the concentration of the membrane-casting solution is 0.5-25 wt %, preferably 1-20 wt %, and more preferably 5-15 wt %.

The support in the Invention is selected from organic-material or inorganic-material basement membrane, preferably any one from polytetrafluoroethylene, acetyl cellulose and ceramics.

Featuring unique micropore structure and excellent mechanical properties and thermal stability, 3D reticular polymer of intrinsic microporosity is very popular among researchers currently and is titled as the most promising material for gas separation membrane. But since its reticular structure is insoluble in common solvents, its application in separation membrane is greatly restricted. The Invention has overcome the shortcomings of the VOC separation membrane such as poor membrane forming property, aging and low separation efficiency resulted from the property that the reticular polyamide material is insoluble in common solvents. Meanwhile, it effectively controls the VOC separation capability of polyamide membrane to meet different separation requirements through adjusting a series of parameters in the membrane preparation process.

Figure 1:
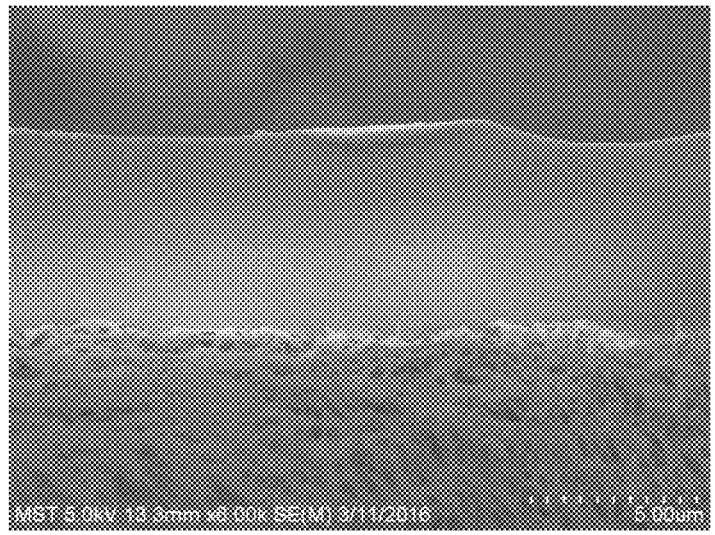
FIG. 1 is an SEM micrograph of the section of the separation membrane obtained in the Invention.
Figure 2:
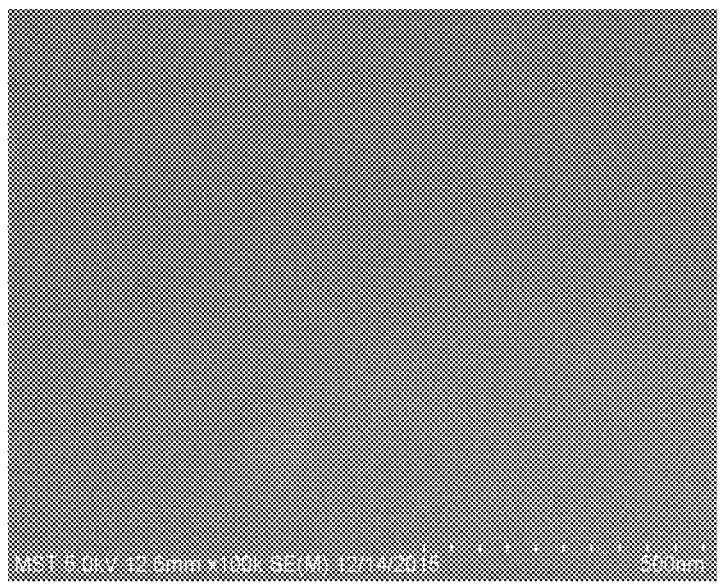
FIG. 2 is an SEM micrograph of the surface of the separation membrane obtained in the Invention.
Figure 3:
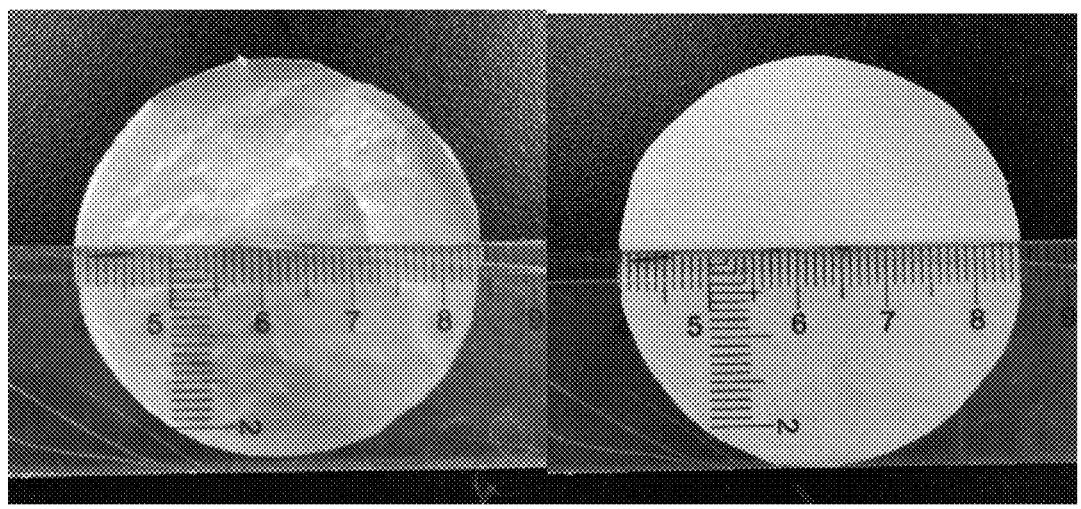
FIG. 3 is an SEM digital graph of the surface of the separation membrane obtained in the Invention.

Wherein, the figure on the left is of triptyl polymer composite separation membrane; and the figure on the right is of polytetrafluoroethylene basement membrane.

DETAILED DESCRIPTION OF THE PREFERRED EMBODIMENTS

The Invention will be further described in combination with the embodiments, but the scope of protection of the Invention is not limited to the following:

Formula for calculating retention rate of triptyl polymer separation membrane is as follows:

$$R = \left(1 - \frac{Pp}{Pb}\right) \times 100\%$$

Where, Pp stands for the concentration of VOCs on the permeate side (ppm), Pb stands for the concentration of VOCs on the feed side (ppm) and R stands for the retention rate.

Embodiment 1

Take 0.6 g 2,6,14-triamino triptycene, 0.7 g 2,2'-bis(trifluoromethyl)-4,4'-diaminodiphenyl ether and 1.6 g sebacoyl chloride and put them into a 250 ml flask, add 50 ml dimethyl formamide under normal temperature and stir and dissolve them, and then add 1 ml pyridine. Reduce the temperature to −5° C. to react for 5 hours (under protection of nitrogen). Raise to the room temperature when the reaction is completed and then add 150 ml deionized water for precipitation. Filter out the precipitates and wash with methanol for 3-4 times and dry the precipitates in vacuum under 50° C. One of the distinctive features between the method and Patent CN201510883253.2 is that: the composite membrane is dissolved and prepared in aprotic solvent after the prepared polymer goes through washing, purification and drying, which produces composite membrane with higher homogeneity and better separation performance.

Solubility Test:

Take dried precipitates to conduct solubility test respectively in solvents of chloroform, water, methyl pyrrolidone, tetrahydrofuran, dimethyl formamide, dimethyl acetamide, dimethyl sulfoxide, hexamethylphosphoric amide, ether, cyclohexane and n-heptane. The test results indicate that the precipitates are soluble in aprotic polar solvents of dimethyl formamide, dimethyl acetamide, dimethyl sulfoxide, methyl pyrrolidone and hexamethylphosphoric amide.

Take 0.8 g copolymer and dissolve it in 10 ml dimethyl formamide, put it through vacuum defoaming and leave it undisturbed for 2 hours after being dissolved, apply the obtained membrane-casting solution on the polytetrafluoroethylene support and dry 24 hours in the 80° C. oven to get fluorinated triptyl radical polyamide membrane.

Test the separation performance of the composite membrane obtained from the Embodiment to $N_2/C_6H_6$ system: when the temperature is 25° C. and the pressure is 10 kpa, the seepage velocity is 0.24 $L/m^2$ min; after membrane separation, the concentration of cyclohexane decreases to 90 ppm on the permeate side compared to 30000 ppm on the feed side and the retention rate proves to be 99.7%.

Test the separation performance of the composite membrane obtained from the Embodiment to $N_2/C_6H_6$ system: when the temperature is 25° C. and the pressure is 2 kpa, the seepage velocity is 0.10 $L/m^2$ min; after membrane separation, the concentration of cyclohexane decreases to 12 ppm on the permeate side compared to 30000 ppm on the feed side and the retention rate proves to be 99.96%.

Figure 4:
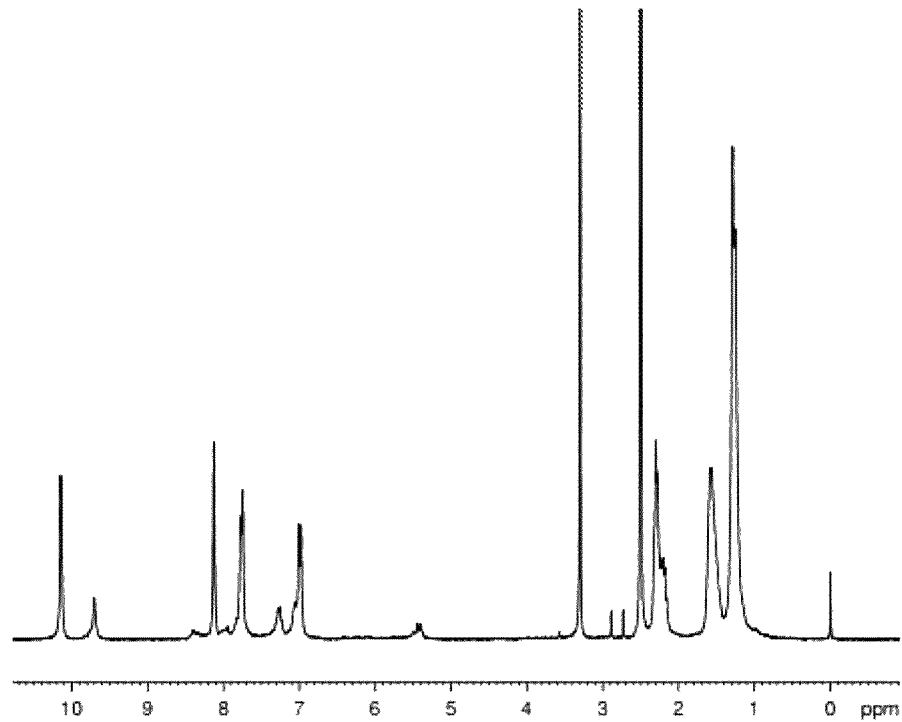
FIG. 4 is the H-NMR of the product obtained through preparation in Embodiment 1 of the Invention.

Conduct nuclear magnetic resonance analysis for the target product obtained from Embodiment 1. The H-NMR is shown in FIG. 4 and the detailed analytical data for C-NMR and H-NMR is as follows:

H-NMR
The characteristic absorption peak of hydrogen atom of sebacoyl chloride is observed when $\delta$=1.0-2.5 ppm.
The characteristic absorption peak of bridgehead hydrogen atom of 2,6,14-triamino triptycene is observed when $\delta$=5.5-5.6 ppm.
The characteristic absorption peak on benzene ring is observed when $\delta$=6.97-7.78 ppm.
The absorption peak of hydrogen atom on benzene ring of 2,2'-bis(trifluoromethyl)-4,4'-diaminodiphenyl ether is observed when $\delta$=8.12 ppm.
The characteristic peak of hydrogen atom of the two amide groups is observed when $\delta$=10.15.

C-NMR
The characteristic absorption peak of carbon atom of sebacoyl chloride is observed when $\delta$=24-38 ppm.
The characteristic absorption peak of bridgehead carbon of 2,6,14-triamino triptycene is observed when $\delta$=53 ppm.
The carbon absorption peak for 2,6,14-triamino triptycene and on benzene ring of 2,2'-bis(trifluoromethyl)-4,4'-diaminodiphenyl ether is observed when $\delta$=115-136 ppm.
The characteristic absorption peak of carbon atom of amido bond is observed when $\delta$=174 ppm.

Yield
2.62 g product is prepared in Embodiment 1 and the yield is calculated to be 90.34%.

Embodiment 2

Take 0.3 g 2,7,14-triamino triptycene, 0.428 g 1,3-bis(2-trifluoromethyl-4-aminophenoxy)benzene and 0.546 g glutaryl chloride and put them into a 250 ml flask, add 40 ml dimethyl formamide under normal temperature and stir and dissolve them, and then add 1.5 ml triethylamine. Reduce the temperature to 0° C. to react for 10 hours (under protection of nitrogen). Raise to the room temperature when the reaction is completed and then add 100 ml deionized water for precipitation. Filter out the precipitates and wash with methanol for 3-4 times and dry the precipitates in vacuum under 60° C. One of the distinctive features between the method and Patent CN201510883253.2 is that: the composite membrane is dissolved and prepared in aprotic solvent after the prepared polymer goes through washing, purification and drying, which produces composite membrane with higher homogeneity and better separation performance.

Solubility Test:
Take dried precipitates to conduct solubility test in solvents of chloroform, water, methyl pyrrolidone, tetrahydrofuran, dimethyl formamide, dimethyl acetamide, dimethyl sulfoxide, hexamethylphosphoric amide, ether, cyclohexane and n-heptane. The test results indicate that the precipitates are soluble in aprotic polar solvents of dimethyl formamide, dimethyl acetamide, dimethyl sulfoxide, methyl pyrrolidone and hexamethylphosphoric amide.

Take 0.5 g copolymer and dissolve it in 10 ml dimethyl formamide, put it through vacuum defoaming and leave it undisturbed for 2 hour after being dissolved, apply the obtained membrane-casting solution on the polyetherimide support and dry 36 hours in the 90° C. vacuum oven to get fluorinated triptyl radical polyamide membrane.

Test the separation performance of the composite membrane obtained from the Embodiment to $N_2/C_6H_6$ system: when the temperature is 25° C. and the pressure is 10 kpa, the seepage velocity is 0.25 $L/m^2$ min; after membrane separation, the concentration of cyclohexane decreases to 120 ppm on the permeate side compared to 30000 ppm on the feed side and the retention rate proves to be 99.6%.

Conduct nuclear magnetic resonance analysis for the target product obtained from Embodiment 2. The detailed analytical data for C-NMR and H-NMR is as follows:

H-NMR
The characteristic absorption peak of hydrogen atom of glutaryl chloride is observed when $\delta$=2.0-2.1, 2.2-2.3 ppm.
The characteristic absorption peak of bridgehead hydrogen atom of 2,7,14-triamino triptycene is observed when $\delta$=5.2-5.3 ppm.
The absorption peak of hydrogen atom of 2,7,14-triamino triptycene and on benzene ring of 1,3-bis(2-trifluoromethyl-4-aminophenoxy)benzene is observed when $\delta$=6.3-7.8 ppm.
The absorption peak of hydrogen atom on benzene ring of 1,3-bis(2-trifluoromethyl-4-aminophenoxy)benzene is observed when $\delta$=7.9-8.0 ppm.
The characteristic absorption peak of hydrogen atom of the two amide groups is observed when $\delta$=10.2.

C-NMR
The characteristic absorption peak of carbon atom of glutaryl chloride is observed when $\delta$=21-22 ppm, 34-37 ppm.
The characteristic absorption peak of bridgehead carbon of 2,7,14-triamino triptycene is observed when $\delta$=46 ppm and 54 ppm.
The carbon absorption peak for 2,7,14-triamino triptycene and on benzene ring of 1,3-bis(2-trifluoromethyl-4-aminophenoxy)benzene is observed when $\delta$=107-148 ppm.
The absorption peak of carbon atom on benzene ring of 1,3-bis(2-trifluoromethyl-4-aminophenoxy)benzene is observed when $\delta$=158 ppm.
The characteristic absorption peak of carbon atom of amido bond is observed when $\delta$=183 ppm.

Yield 1.08
1.08 g product is prepared in Embodiment 2 and the yield is calculated to be 84.77%.

Embodiment 3

Take 0.45 g 9,10-dimethyl-2,6,14-triamino triptycene, 0.6 g 1,3-bis(2-trifluoromethyl-4-aminophenoxy)benzene and 0.85 g adipoyl chloride and put them into a 250 ml flask, add 45 ml dimethyl formamide under normal temperature and stir and dissolve them, and then add 0.5 ml N,N-diisopropyl ethylamine. Reduce the temperature to 5° C. to react for 12 hours (under protection of nitrogen). Raise to the room temperature when the reaction is completed and then add 120 ml deionized water for precipitation. Filter out the precipitates and wash with methanol for 3-4 times and dry the precipitates in vacuum under 70° C. One of the distinctive features between the method and Patent CN201510883253.2 is that: the composite membrane is dissolved and prepared in aprotic solvent after the prepared polymer goes through washing, purification and drying, which produces composite membrane with higher homogeneity and better separation performance.

Solubility Test:

Take dried precipitates to conduct solubility test in solvents of chloroform, water, methyl pyrrolidone, tetrahydrofuran, dimethyl formamide, dimethyl acetamide, dimethyl sulfoxide, hexamethylphosphoric amide, ether, cyclohexane and n-heptane. The test results indicate that the precipitates are soluble in aprotic polar solvents of dimethyl formamide, dimethyl acetamide, dimethyl sulfoxide, methyl pyrrolidone and hexamethylphosphoric amide.

Take 0.6 g copolymer and dissolve it in 10 ml dimethyl formamide, put it through vacuum defoaming and leave it undisturbed for 2 hour after being dissolved, apply the obtained membrane-casting solution on the polyvinylidene fluoride support and dry 48 hours in the 100° C. oven to get fluorinated triptyl radical polyamide membrane.

Test the separation performance of the composite membrane obtained from the Embodiment to $N_2/C_6H_6$ system: when the temperature is 25° C. and the pressure is 10 kpa, the seepage velocity is 0.32 $L/m^2$ min; after membrane separation, the concentration of cyclohexane decreases to 240 ppm on the permeate side compared to 30000 ppm on the feed side and the retention rate proves to be 99.2%.

Conduct nuclear magnetic resonance analysis for the target product obtained from Embodiment 3. The detailed analytical data for C-NMR and H-NMR is as follows:

H-NMR

The characteristic absorption peak of hydrogen atom of adipoyl chloride is observed when $\delta$=1.6-1.7 ppm, 2.3-2.4 ppm.

The characteristic absorption peak of hydrogen atom of the two methyl on 9,10 positions of 9,10-dimethyl-2,6,14-triamino triptycene is observed when $\delta$=2.0-2.1 ppm.

The absorption peak of hydrogen atom of 9,10-dimethyl-2,6,14-triamino triptycene and on benzene ring of 1,3-bis(2-trifluoromethyl-4-aminophenoxy)benzene is observed when $\delta$=6.2-7.8 ppm.

The absorption peak of hydrogen atom on benzene ring of 1,3-bis(2-trifluoromethyl-4-aminophenoxy)benzene is observed when $\delta$=8.0-8.1 ppm.

The characteristic peak of hydrogen atom of amido bond is observed when $\delta$=10. 1 ppm.

C-NMR

The characteristic absorption peak of carbon atom of the two methyl of bridgehead carbon of 9,10-dimethyl-2,6,14-triamino triptycene is observed when $\delta$=14.5 ppm.

The characteristic absorption peak of carbon atom of adipoyl chloride is observed when $\delta$=25-26, 36-38 ppm.

The characteristic absorption peak of carbon atom of bridgehead carbon of 9,10-dimethyl-2,6,14-triamino triptycene is observed when $\delta$=49.3 ppm.

The absorption peak of carbon atom of 9,10-dimethyl-2,6,14-triamino triptycene and on benzene ring of 1,3-bis(2-trifluoromethyl-4-aminophenoxy)benzene is observed when $\delta$=106-148 ppm.

The absorption peak of carbon atom on benzene ring of 1,3-bis(2-trifluoromethyl-4-aminophenoxy)benzene is observed when $\delta$=158 ppm.

The characteristic absorption peak of carbon atom of amido bond is observed when $\delta$=180 ppm.

Yield 1.63 g product is prepared in Embodiment 3 and the yield is calculated to be 85.79%.

Embodiment 4

Take 0.45 g 9,10-dimethyl-2,6,14-triamino triptycene, 0.336 g 1,4-bis(2-trifluoromethyl-4-aminophenoxy)benzene and 0.72 g terephthaloyl chloride and put them into a 250 ml flask, add 40 ml dimethyl formamide under normal temperature and stir and dissolve them, and then add 1 ml triethanol amine. Reduce the temperature to 10° C. to react for 15 hours (under protection of nitrogen). Raise to the room temperature when the reaction is completed and then add 110 ml deionized water for precipitation. Filter out the precipitates and wash with methanol for 3-4 times and dry the precipitates in vacuum under 70° C. One of the distinctive features between the method and Patent CN201510883253.2 is that: the composite membrane is dissolved and prepared in aprotic solvent after the prepared polymer goes through washing, purification and drying, which produces composite membrane with higher homogeneity and better separation performance.

Solubility Test:

Take dried precipitates to conduct solubility test in solvents of chloroform, water, methyl pyrrolidone, tetrahydrofuran, dimethyl formamide, dimethyl acetamide, dimethyl sulfoxide, hexamethylphosphoric amide, ether, cyclohexane and n-heptane. The test results indicate that the precipitates are soluble in aprotic polar solvents of dimethyl formamide, dimethyl acetamide, dimethyl sulfoxide, methyl pyrrolidone and hexamethylphosphoric amide.

Take 0.7 g copolymer and dissolve it in 10 ml dimethyl formamide, put it through vacuum defoaming and leave it undisturbed for 2 hour after being dissolved, apply the obtained membrane-casting solution on the polysulfone support and dry 60 hours in the 110° C. vacuum oven to get fluorinated triptyl radical polyamide membrane.

Test the separation performance of the composite membrane obtained from the Embodiment to $N_2/C_6H_6$ system: when the temperature is 25° C. and the pressure is 10 kpa, the seepage velocity is 0.31 $L/m^2$ min; after membrane separation, the concentration of cyclohexane decreases to 273 ppm on the permeate side compared to 30000 ppm on the feed side and the retention rate proves to be 99.09%.

Conduct nuclear magnetic resonance analysis for the target product obtained from Embodiment 4. The detailed analytical data for C-NMR and H-NMR is as follows:

H-NMR

The characteristic absorption peak of hydrogen atom of the two methyl on 9,10 positions of 9,10-dimethyl-2,6,14-triamino triptycene is observed when $\delta$=2.3 ppm.

The absorption peak of hydrogen atom of 9,10-dimethyl-2, 6,14-triamino triptycene and on benzene ring of 1.4-bis(2-trifluoromethyl-4-aminophenoxy)benzene is observed when $\delta$=6.2-7.5 ppm.
The absorption peak of hydrogen atom on benzene ring of 1.4-bis(2-trifluoromethyl-4-aminophenoxy)benzene is observed when $\delta$=8.0 ppm.
The characteristic absorption peak of hydrogen atom of terephthaloyl chloride is observed when $\delta$=8.1-8.2 ppm.
The characteristic absorption peak of hydrogen atom of amido bond is observed when $\delta$=10.4 ppm.
C-NMR
The absorption peak of hydrogen atom of the methyl on 9,10 positions of 9,10-dimethyl-2,6,14-triamino triptycene is observed when $\delta$=13.5 ppm.
The characteristic absorption peak of bridgehead carbon of 9,10-dimethyl-2,6,14-triamino triptycene is observed when $\delta$=48.4 ppm.
The absorption peak of hydrogen atom of 9,10-dimethyl-2, 6,14-triamino triptycene, terephthaloyl chloride and on benzene ring of 1.4-bis(2-trifluoromethyl-4-aminophenoxy) benzene is observed when $\delta$=109-149 ppm.
The characteristic absorption peak of carbon atom of amido bond is observed when $\delta$=166 ppm.
Yield
1.27 g product is prepared in Embodiment 4 and the yield is calculated to be 84.33%.

Embodiment 5

Figure 5:
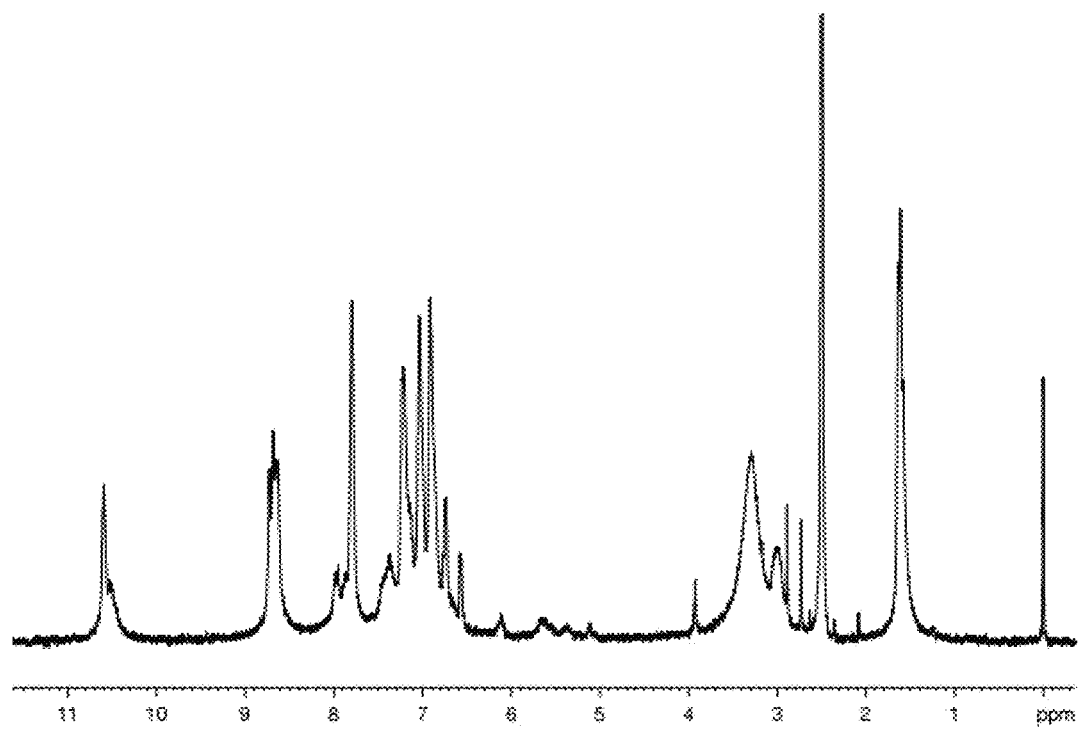
FIG. 5 is the H-NMR of the product obtained through preparation in Embodiment 5 of the Invention.
Figure 6:
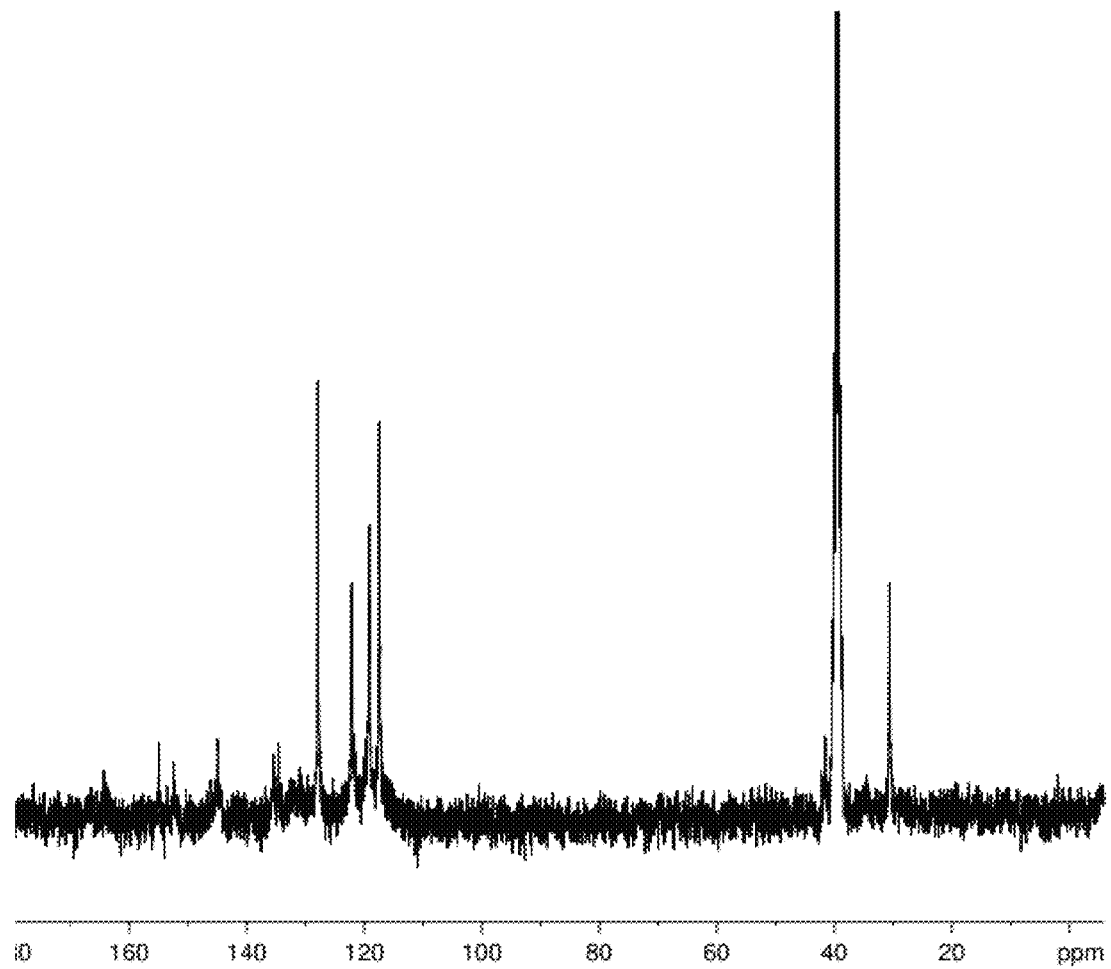
FIG. 6 is the C-NMR of the product obtained through preparation in Embodiment 5 of the Invention.

Take 0.3 g 2,7,14-triamino triptycene, 0.428 g 2,2-bis[4-(4-aminophenoxy)phenyl]propane and 0.538 g trimesoyl chloride and put them into a 250 ml flask, add 45 ml dimethyl formamide under normal temperature and stir and dissolve them, and then add 2.5 ml 4-dimethylamino pyridine. Reduce the temperature to 15° C. to react for 18 hours (under protection of nitrogen). Raise to the room temperature when the reaction is completed and then add 100 ml deionized water for precipitation. Filter out the precipitates and wash with methanol for 3-4 times and dry the precipitates in vacuum under 80° C. One of the distinctive features between the method and Patent CN201510883253.2 is that: the composite membrane is dissolved and prepared in aprotic solvent after the prepared polymer goes through washing, purification and drying, which produces composite membrane with higher homogeneity and better separation performance.
Solubility Test:
Take dried precipitates to conduct solubility test in solvents of chloroform, water, methyl pyrrolidone, tetrahydrofuran, dimethyl formamide, dimethyl acetamide, dimethyl sulfoxide, hexamethylphosphoric amide, ether, cyclohexane and n-heptane. The test results indicate that the precipitates are soluble in aprotic polar solvents of dimethyl formamide, dimethyl acetamide, dimethyl sulfoxide, methyl pyrrolidone and hexamethylphosphoric amide.
Take 0.7 g copolymer and dissolve it in 7 ml dimethyl formamide, put it through vacuum defoaming and leave it undisturbed for 2 hour after being dissolved, apply the obtained membrane-casting solution on the acetyl cellulose support and dry 72 hours in the 120° C. oven to get fluorinated triptyl radical polyamide membrane.
Test the separation performance of the composite membrane obtained from the Embodiment to $N_2/C_6H_6$ system: when the temperature is 25° C. and the pressure is 10 kpa, the seepage velocity is 0.36 L/m² min; after membrane separation, the concentration of cyclohexane decreases to 276 ppm on the permeate side compared to 30000 ppm on the feed side and the retention rate proves to be 99.08%.
Conduct nuclear magnetic resonance analysis for the target product obtained from Embodiment 5. The detailed analytical data for H-NMR (FIG. 5) and C-NMR (FIG. 6) is as follows:
H-NMR
The absorption peak of hydrogen atom of the methyl on 2,2-bis[4-(4-aminophenoxy)phenyl]propane is observed when $\delta$=1.58-1.62 ppm.
The characteristic absorption peak of hydrogen atom of bridgehead carbon of 2,7,14-triamino triptycene is observed when $\delta$=5.35 ppm.
The absorption peak of hydrogen atom of 1,3,5-trimesoyl chloride, 2,7,14-triamino triptycene and on benzene ring of 2,2-bis[4-(4-aminophenoxy)phenyl]propane is observed when $\delta$=6.6-8.0 ppm.
The absorption peak of hydrogen atom on benzene ring of 1,3,5-trimesoyl chloride is observed when $\delta$=8.6-8.7 ppm.
The characteristic absorption peak of hydrogen atom of amido bond is observed when $\delta$=10.5. ppm
C-NMR
The characteristic absorption peak of carbon atom of the two methyl on 2,2-bis[4-(4-aminophenoxy)phenyl]propane is observed when $\delta$=30.5 ppm.
The absorption peak of carbon atom of bridgehead carbon of 2,7,14-triamino triptycene and on the two benzene ring connections of 2,2-bis[4-(4-aminophenoxy)phenyl]propane is observed when $\delta$=38-40 ppm.
The absorption peak of carbon atom of 2,7,14-triamino triptycene, 1,3,5-trimesoyl chloride, and on benzene ring of 2,2-bis[4-(4-aminophenoxy)phenyl]propane is observed when $\delta$=117-145 ppm.
The absorption peak of carbon atom on benzene ring of 2,2-bis[4-(4-aminophenoxy)phenyl]propane is observed when $\delta$=152-155 ppm.
The absorption peak of carbon atom of acyl chloride in 1,3,5-trimesoyl chloride is observed when $\delta$=164 ppm.
Yield
1.12 g product is prepared in Embodiment 5 and the yield is calculated to be 88.47%.

Embodiment 6

Take 0.455 g 2,6,14-triamino triptycene, 0.363 g 3,4-diamino diphenylether and 0.823 g glutaryl chloride and put them into a 250 ml flask, add 30 ml dimethyl formamide under normal temperature and stir and dissolve them, and then add 1.5 ml triethanol amine. Reduce the temperature to 0° C. to react for 10 hours (under protection of nitrogen). Raise to the room temperature when the reaction is completed and then add 110 ml deionized water for precipitation. Filter out the precipitates and wash with methanol for 3-4 times and dry the precipitates under 80° C. One of the distinctive features between the method and Patent CN201510883253.2 is that: the composite membrane is dissolved and prepared in aprotic solvent after the prepared polymer goes through washing, purification and drying, which produces composite membrane with higher homogeneity and better separation performance.
Solubility Test:
Take dried precipitates to conduct solubility test in solvents of chloroform, water, methyl pyrrolidone, tetrahydrofuran, dimethyl formamide, dimethyl acetamide, dimethyl sulfoxide, hexamethylphosphoric amide, ether, cyclohexane and n-heptane. The test results indicate that the precipitates are soluble in aprotic polar solvents of dimethyl formamide, dimethyl acetamide, dimethyl sulfoxide, methyl pyrrolidone and hexamethylphosphoric amide.

Take 0.6 g copolymer and dissolve it in 10 ml dimethyl formamide, put it through vacuum defoaming and leave it undisturbed for 2 hour after being dissolved, apply the obtained membrane-casting solution on the polysulfone support and dry 60 hours in the 100° C. vacuum oven to get triptyl radical polyamide membrane.

Test the separation performance of the composite membrane obtained from the Embodiment to $N_2/C_6H_6$ system: when the temperature is 25° C. and the pressure is 10 kpa, the seepage velocity is 0.32 $L/m^2$ min; after membrane separation, the concentration of cyclohexane decreases to 150 ppm on the permeate side compared to 30000 ppm on the feed side and the retention rate proves to be 99.5%.

The above embodiments, rather than limitation to the scope of protection of the Invention, are only the description of the technical conceptions of the Invention. Any technical conceptions put forward according to the Invention or any amendment made based on the technical scheme shall fall within the protection scope of the Invention: technology not covered in the Invention can all be achieved through current technology.

Figure 7:
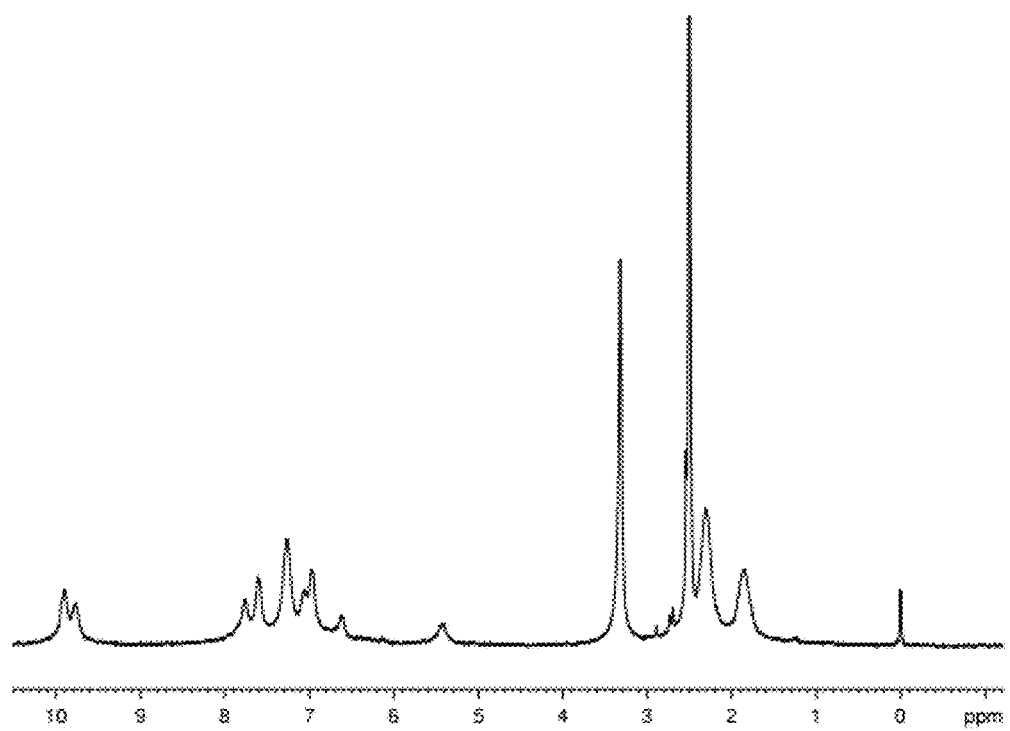
FIG. 7 is the H-NMR of the product obtained through preparation in Embodiment 6 of the Invention.

Conduct nuclear magnetic resonance analysis for the target product obtained from Embodiment 6. The detailed analytical data for H-NMR (FIG. 7) and C-NMR is as follows:
H-NMR
The characteristic absorption peak of hydrogen atom of glutaryl chloride is observed when δ=2.3-2.5 ppm.
The characteristic absorption peak of hydrogen atom of bridgehead carbon of 2,6,14-triamino triptycene is observed when δ=5.4 ppm.
The absorption peak of hydrogen atom of 2,6,14-triamino triptycene and on benzene ring of 3,4-diamino diphenylether is observed when δ=6.6-7.8.
The characteristic absorption peak of hydrogen atom of amido bond is observed when δ=9.8-9.9 ppm.
C-NMR
The characteristic absorption peak of carbon atom of glutaryl chloride is observed when δ=23.1 and 38.4 ppm.
The characteristic absorption peak of bridgehead carbon of 2,6,14-triamino triptycene is observed when δ=54.1 ppm.
The absorption peak of carbon atom of 2,6,14-triamino triptycene and on benzene ring of 3,4-diamino diphenylether is observed when δ=110-147 ppm.
The absorption peak of carbon atom on benzene ring of 3,4-diamino diphenylether is observed when δ=157.2 ppm.
The characteristic absorption peak of carbon atom of amido bond is observed when δ=180.2 ppm.
Yield
1.42 g product is prepared in Embodiment 6 and the yield is calculated to be 86.58%.

Reference Embodiment 1

Repeat the method in Embodiment 3 of Patent CN201510883253.2, take 2,6,14-triamino triptycene and sebacoyl chloride as main monomers, pyridine as acid-binding agent and methyl pyrrolidone as solvents for synthesis, wherein the specific steps are as follows: add 1 mol 2,6,14-triamino triptycene, 3 mol pyridine and 2 mol sebacoyl chloride into methyl pyrrolidone solvent to stir and dissolve, react for 3.5 h under 2° C. (under protection of nitrogen), raise to the room temperature when the reaction is completed and then add deionized water for precipitation. Filter out the precipitates and wash with methanol and dry the precipitates in vacuum under 80° C.

Take 0.7 g dried polymer and dissolve it in 7 ml dimethyl formamide, the polymer fails to dissolve completely, therefore homogeneous membrane-casting solution cannot be obtained.

The invention claimed is:
1. A preparation method for a triptyl polymer separation membrane, the method comprising the following steps:
   (1) Take triptycene compound containing active group, dichloride compound and diamino compound containing ether bond as monomers, and conduct polymerization in aprotic organic solvent in the presence of acid-binding agent to obtain a polymer solution; pour the obtained polymer solution into deionized water for reaction and for precipitation thereafter, filter out precipitates and wash with methanol and dry to get triptyl polymer; the triptycene compound containing active group is a multi-amino-substituted triptycene compound or derivative of the multi-amino-substituted triptycene compound;
   (2) Dissolve the triptyl polymer in aprotic organic solvent to produce a membrane-casting solution, apply the solution on support and dry to get a triptyl polymer separation membrane.
2. The method according to claim 1, wherein, in Step (1), the triptyl polymer is obtained by pouring polymer solution into deionized water for precipitation, filtering out precipitates and washing with methanol for several times and then drying the filtered-out precipitates; wherein, an oven is adopted for drying the filtered-out substance and the drying temperature is 40° C.–120° C.
3. The method according to claim 1, wherein, the triptycene compound containing active group is any one selected from hexamino-substituted triptycene compound or derivative of hexamino-substituted triptycene compound, tetramino-substituted triptycene compound or derivative of tetramino-substituted triptvcene compound, triamino-substituted triptycene compound or derivative of triamino-substituted triptycene compound, and diamino-substituted triptycene compound or derivative of diamino-substituted triptycene compound; preferably from any one of 2,3,6,7,12,13-hexamino triptycene, 2,3,6,7-tetramino triptycene, 2,6,14-triamino triptycene, 2,7,14-triamino triptycene, 9,10-dimethyl-2,6,14-triamino triptycene, 9,10-dimethyl-2,7,14-triamino triptycene, 2,6-diamino triptycene and 2,7-diamino triptycene.
4. The method according to claim 1, wherein, the dichloride compound is any one selected from oxalyl chloride, malonyl chloride, succinyl chloride, glutaryl chloride, adipoyl chloride, 1, 7-pimeloyl chloride, azelaoyl chloride, hexafluoro glutaryl chloride, sebacoyl chloride, 1,8-suberoyl chloride, terephthaloyl chloride, isophthaloyl chloride, o-phthaloyl chloride, cyclohexyl-1,4-dicarboxyl chloride, trimesoyl chloride, fumaryl chloride, tetrafluoro terephthaloyl chloride, hexafluoro glutaryl chloride, dodecanedioyl dichloride, 1,8-suberoyl chloride, 2,6-chloroformyl pyridine, 1,4-phenylene diacryloyl chloride, trans-3,6-endo-methylene-1,2,3,6-tetrahydrophthaloyl chloride, 5-amino-2, 4,6-triiodo-1,3-benzenedicarboxylic acid acyl chloride, azobenzene-4,4'-dicarbonyl dichloride, 4,4'-biphenyldicarbonyl chloride, trans-cyclobutane-1,2-dicarbonyl dichloride, 1,4-phenylene diacryloyl chloride and bisphenol A bis(chloroformate).
5. The method according to claim 1, wherein, the diamino compound containing ether bond is any one selected from bis(3-aminopropyl) ether, 3,4-oxydianiline, resorcinol digly- cidyl ether, 4,4'-oxydianiline, neopentyl glycol bis(4-aminophenyl) ether, 1,3-bis(4-aminophenoxy)benzene, N-methyl-N-(4-aminophenoxy ethyl)-4-aminophenyl ethanamine, 2,2-bis[4-(4-aminophenoxy)phenyl]-1,1,1,3,3,3-hexafluoropropane, 2,2'-diamino glycol diphenyl ether, 1,8-diamino-3,6-dioxaoctane, bis[4-(3-aminophenoxy)phenyl]sulfone, 1,4-butanediol bis(3-aminocrotonate), 4,4"-diamino-p-terphenyl, 2,2-bis[(4-aminophenoxy)phenyl]hexafluoropropane, 2,2-bis(trifluoromethyl)-4,4-diaminodiphenyl ether, 1,3-bis(2-trifluoromethyl-4-aminophenoxy)benzene, 1,4-bis(2-trifluoromethyl-4-aminophenoxy)benzene and 2,2-bis[4-(4-aminophenoxy)phenyl]propane.

6. The method according to claim 1, wherein, in Step (1), the aprotic organic solvent is any one selected from methyl pyrrolidone, dimethyl formamide, dimethyl acetamide, dimethyl sulfoxide and hexamethylphosphoric triamide; the acid-binding agent is organic base or inorganic base, preferably any one selected from pyridine, triethylamine, N,N-diisopropyl ethylamine, 4-dimethylamino pyridine, triethanol amine, potassium carbonate, sodium carbonate, sodium bicarbonate, potassium hydroxide and sodium hydroxide; the polymerization temperature is −5-15° C. and the reaction time is 1-18 hours and the polymerization is conducted under protection of inert gas.

7. The method according to claim 1, wherein, in Step (1), the molar ratio among the three monomers, i.e. the triptycene compound containing active group, dichloride compound and diamino compound containing ether bond is 1:1.0-20.0:0.2-10; preferably 1:2.0-10.0:0.5-5; the molar dosage of acid-binding agent is 1-10 times of that of dichloride compound, preferably 1.5-5 times.

8. The method according to claim 1, wherein, in Step (2), the aprotic organic solvent is any one selected from methyl pyrrolidone, dimethyl formamide, dimethyl acetamide, dimethyl sulfoxide, hexamethylphosphoric amide, acetonitrile and dioxane; the concentration of the membrane-casting solution is 0.5-25 wt %.

9. The method according to claim 1, wherein, in Step (2), the support is selected from organic-material or inorganic-material basement membrane, preferably any one from polytetrafluoroethylene, acetyl cellulose and ceramics.

10. The method according to claim 1, wherein, in Step (2), the triptyl polymer separation membrane is made by dissolving the triptyl polymer in aprotic organic solvent, producing membrane-casting solution after putting it through vacuum defoaming and leaving it undisturbed, applying the solution on support and drying with an oven; and the drying temperature is 40° C.-150° C. and the drying duration is 2-96 hours.

\* \* \* \* \*